UNITED STATES PATENT OFFICE.

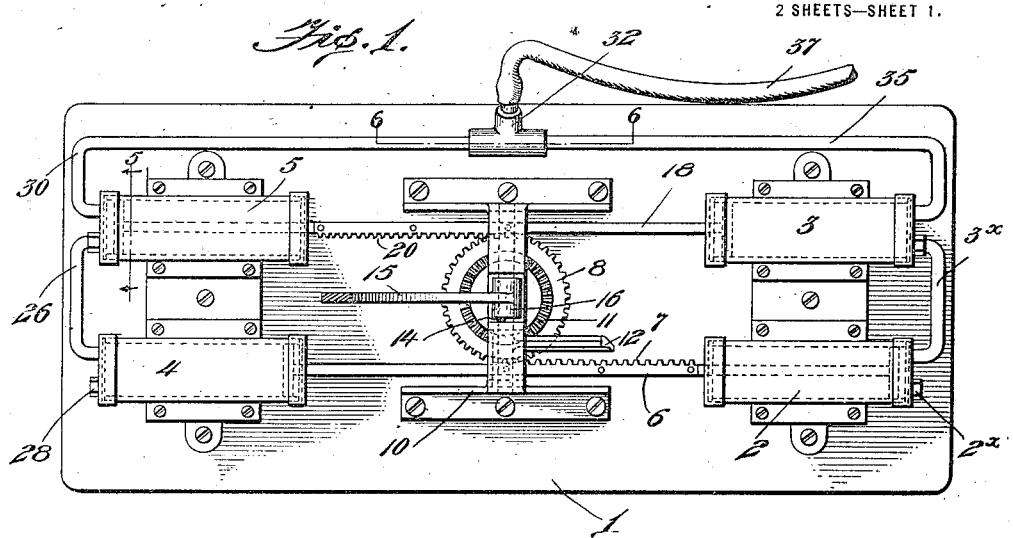

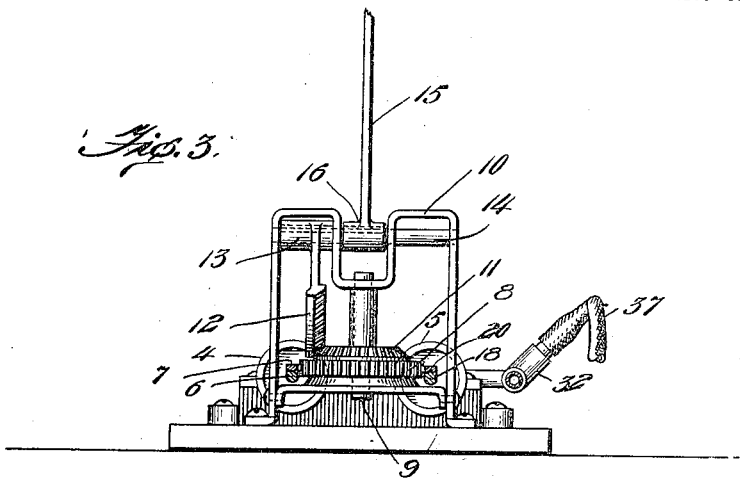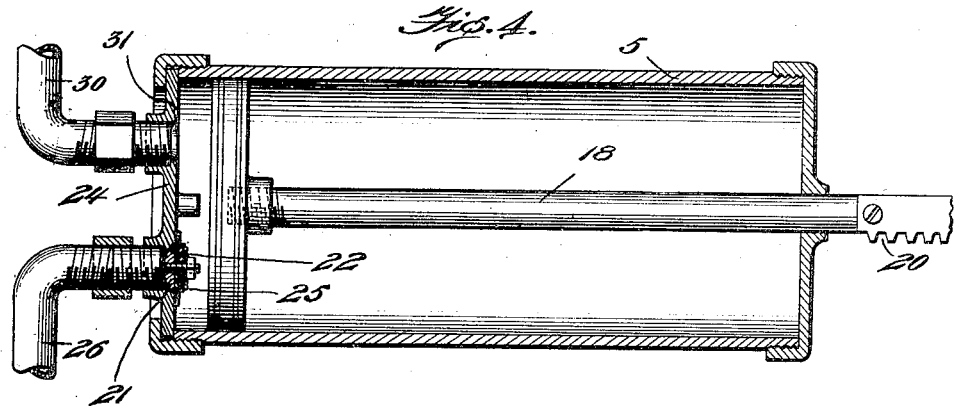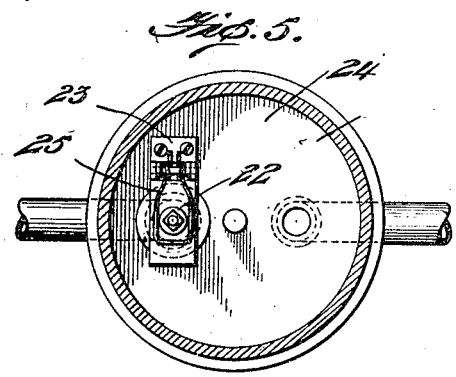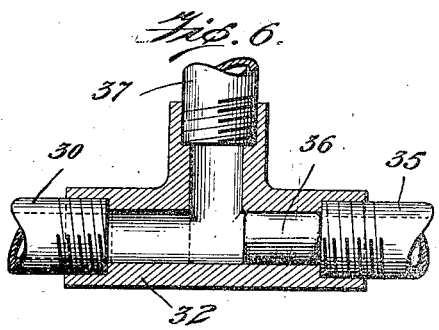

THOMAS H. NIELSEN, OF WYOMING, DELAWARE.

TIRE-PUMP.

1,288,966.

Specification of Letters Patent.

Patented Dec. 24, 1918.

Application filed May 13, 1918. Serial No. 234,231.

*To all whom it may concern:*

Be it known that I, THOMAS H. NIELSEN, a citizen of the United States, residing at Wyoming, in the county of Kent and State of Delaware, have invented certain new and useful Improvements in Tire-Pumps; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in tire pumps and consists in the provision of a double set of cylinders geared together and forming a double acting pump, a suitable valve mechanism being provided and which is automatically operated to permit a continuous flow of air to pass from the pump.

My invention consists in the provision of further various details of construction, combinations and arrangements of parts which will be hereinafter fully described, shown in the accompanying drawings and then specifically defined in the appended claims.

I illustrate my invention in the accompanying drawings which, with the letters of reference marked thereon, form a part of this application and in which:

Figure 1 is a top plan view of the pump.

Fig. 2 is a side elevation.

Fig. 3 is an end view.

Fig. 4 is a horizontal sectional view through one of the cylinders.

Fig. 5 is a sectional view on line 5—5 of Fig. 1, and

Fig. 6 is a sectional view on line 6—6 of Fig. 1.

Reference now being had to the details of the drawings by numerals:

1 designates the base upon which the four pump cylinders, designated respectively by numerals 2, 3, 4 and 5 are mounted. The cylinder 2 has a valved opening 2$^x$ at one end and a pipe 3$^x$ communicates between the cylinders 2 and 3. The cylinder 2 has a piston, shown in dotted lines in Fig. 1 of the drawings, mounted therein and which is connected to a stem 6, which is also secured to the piston in the cylinder 4. Said stem 6 is provided with a series of rack teeth 7 thereon and which mesh with the gear wheel 8 fixed to a vertically disposed stub shaft 9 journaled in the frame 10 which rises from the base. A beveled gear 11 is keyed to and rotates with the shaft 9 and is rocked through the medium of the segment beveled gear 12, which has an integral collar 13 journaled upon the horizontally disposed shaft 14, also mounted in the frame 10. A handle 15 is provided with an integral collar 16 mounted upon the shaft 14 to which it is keyed, and serves as a means for rocking the shaft 14, when it is desired to cause a rocking movement to be imparted to the segment gear 12, by which the piston 6 may be reciprocated.

A piston stem 18, similar to the stem 6, has a piston mounted upon one end which rocks within the cylinder 3 and a piston upon its other end rocking within the cylinder 5, and is provided with rack teeth 20 which are also in mesh with the gear wheel 8.

Each cylinder, one of which is shown in longitudinal section in Fig. 4, is provided with a valved opening 21 in one end, and 22 is a valve which is hinged to the plate 23, shown in Fig. 5 of the drawings, which is fastened to the end 24 of the cylinder. A spring 25 fastened to the plate 23 tends to normally hold the valve 21 seated. A pipe 26 leads from the valved opening in the end of the cylinder 5 and communicates with an aperture in the end of the cylinder 4, the end of the latter being provided with a valved inlet opening 28 through which air is drawn into the cylinder 4. A pipe 30 leads from an aperture 31 in the cylinder 5, as shown in Fig. 4 of the drawings, and 32 is a T-shaped elbow, a detail of which is shown in Fig. 6, and with which one end of the pipe 30 communicates, while another pipe 35 also communicates therewith, and leads to and communicates with an aperture in the outer end of the cylinder 3. A cylindrical valve 36 mounted in the elbow 32 is adapted to move therein against the adjacent ends of the pipes 30 and 35 automatically, for the purpose of closing the exit end of one pipe or the other according as one set of pumps or the other are being operated. A pipe 37 leads from the elbow 32 and conveys the air away therefrom. Each pump is of similar construction, as shown in Fig. 4 of the drawings and operates automatically.

In operation, when the lever is thrown to the position shown in Fig. 2 of the drawings, any air which may have been drawn into the cylinder 2 will have been forced out of the cylinder through the pipe 3ᵃ and into the cylinder 3, the valve which controls the inlet passage to the cylinder 3, and similar to the valve shown in Fig. 4 of the drawings, being forced open. On a reverse movement of the lever 15, the piston upon the end of the stem 18 will force the air from the cylinder 3 through the pipe 35 and will force the valve 36 to the position shown in dotted lines and against the end of the pipe 30, permitting air to make exit through the pipe 37. As the piston in the cylinder 3 is thrown outward, the piston within the cylinder 4 will have forced air therein through the pipe 26 into the cylinder 5, and air is being drawn into the cylinder 2. When the lever is swung back to the position shown in Fig. 2 of the drawings, the operation is reversed, the valve 36 being thrown back to the position shown in solid lines in Fig. 6 of the drawings, permitting the air in the cylinder 5 to escape through the pipes 30 and 37.

By the arrangement of the operating elements, as set forth, consisting of a gear wheel always exerting the same force at points diametrically opposite its periphery upon the rack bars forming the pistons of the two sets of cylinders, a smooth running effect is obtained by the balanced condition of the operating elements, and which comprises an advantage in the use of four single acting cylinders, instead of double acting ones.

What I claim to be new is:

A double acting tire pump, comprising pairs of pump cylinders arranged tandem and in planes parallel to each other, pistons within said cylinders, piston stems connecting the pistons which are in alinement and provided with rack teeth upon their inner edges, a yoke extending over said piston stems and having a central U-shaped portion, a rock shaft journaled in the walls of the latter and the side walls of the yoke, a handle fastened to said shaft and between the walls of the U-shaped portion, said yoke having a cross piece near the lower portion thereof, a vertical shaft journaled in said U-shaped portion and cross piece, a gear wheel fixed to said shaft and in mesh with the rack teeth on said stems, a beveled pinion fixed to the vertical shaft, a sleeve upon the rock shaft and having an integral segment member the teeth of which are in mesh with the teeth of the beveled pinion, pipes communicating between the opposite ends of two of the cylinders which are in alinement, and pipes communicating between corresponding ends of the different sets of cylinders.

In testimony whereof I hereunto affix my signature in presence of two witnesses.

THOMAS H. NIELSEN.

Witnesses:
A. L. HOUGH,
FRANKLIN H. HOUGH.